(12) United States Patent
Wolf

(10) Patent No.: US 7,935,391 B2
(45) Date of Patent: May 3, 2011

(54) METHOD AND APPARATUS FOR RADIATION CURING

(75) Inventor: Erich Wolf, Pullach (DE)

(73) Assignee: Linde AG, Hollriegelskreuth (DE)

( * ) Notice: Subject to any disclaimer, the term of this patent is extended or adjusted under 35 U.S.C. 154(b) by 1071 days.

(21) Appl. No.: 11/686,973

(22) Filed: Mar. 16, 2007

(65) Prior Publication Data

US 2007/0269609 A1 Nov. 22, 2007

(30) Foreign Application Priority Data

Apr. 7, 2006 (DE) .......................... 10 2006 016 500
Aug. 3, 2006 (EP) ..................................... 06118357

(51) Int. Cl.
*C08F 2/46* (2006.01)
(52) U.S. Cl. ........ 427/487; 427/492; 427/495; 427/496; 427/508; 118/730
(58) Field of Classification Search ................... 427/487, 427/492, 495, 496, 508; 118/730
See application file for complete search history.

(56) References Cited

U.S. PATENT DOCUMENTS

| | | | |
|---|---|---|---|
| 3,985,100 A | 10/1976 | Miller | |
| 5,135,686 A | 8/1992 | Masuhara et al. | |
| 6,527,897 B1 | 3/2003 | Ecker et al. | |
| 7,105,206 B1 | 9/2006 | Beck et al. | |
| 7,153,542 B2 * | 12/2006 | Nguyen et al. | ............ 427/248.1 |

FOREIGN PATENT DOCUMENTS

| | | |
|---|---|---|
| DE | 3427315 | 6/1984 |
| DE | 10153878 A1 | 5/2003 |
| WO | 02/32641 A1 | 4/2002 |

OTHER PUBLICATIONS

European Search Report for EP 06118357 dated Nov. 7, 2006, four pages.

* cited by examiner

*Primary Examiner* — Elena T Lightfoot
(74) *Attorney, Agent, or Firm* — Rankin, Hill & Clark LLP

(57) ABSTRACT

The invention relates to a method for the radiation curing of surfaces of workpieces, wherein the workpieces are held in a multiplicity of hermetically sealable and at least partly radiation-transparent holding fixtures and are fed consecutively in a cycle to an irradiation device (26), wherein the holding fixtures with the workpieces contained therein are purged with inert gas, and before irradiation or in an irradiation station inert gas is fed into a holding fixture and the holding fixture is purged with the inert gas and the gas displaced by purging is fed to a holding fixture at a previous stage of the operating cycle, for purging of the same, and an apparatus for implementation of the method.

10 Claims, 3 Drawing Sheets

METHOD AND APPARATUS FOR RADIATION CURING

Figure 2:
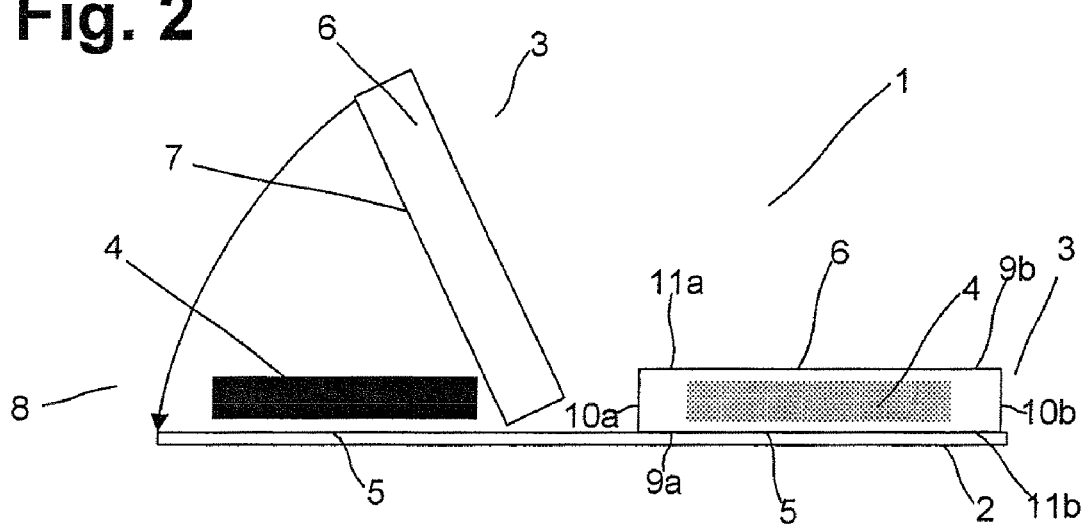

BACKGROUND OF THE INVENTION (1) Field of the Invention

The invention relates to a method and an apparatus for radiation curing.

(2) Description of Related Art

WO 02/32641 A1 and the publication by Erich Beck et. al., "UV-curing in Carbon dioxide" disclose a method of radiation curing in which containers open on one side are used, with the opening at the top or bottom depending on the inert gas involved. The parts to be irradiated are inserted in these containers. In this process, the parts provided with a coating to be cured pass through an entry zone, a radiation chamber and an exit zone. The radiation chamber is provided with one or more irradiation sources for radiation curing, and a gas inlet for the entry of inert gas.

In WO 02/32641, the aim is to avoid the entry of oxygen into the radiation chamber, since reactions with oxygen during curing are undesired and lead to poor results. For this purpose the radiation chamber is designed as a tower, with a bottom section connected to the entry zone and the exit zone, and the irradiation source located in its top section. The parts are therefore fed in to the irradiation chamber from the bottom to the top, while the radiation chamber is open only at the bottom. This should prevent convective or turbulent gas flows which, in the prior art, are supposed to lead to the escape of inert gas and the inflow of oxygen. The inert gas is meant to be fed continuously into the top section of the radiation chamber, where it forms a displacement cushion against oxygen areas of the gas. It is also possible to provide gas curtains.

Known from DE 10 153 878 B4 is an installation for radiation curing with a radiation chamber and which has an irradiation zone with one or more irradiation sources for radiation curing, together with an entry zone and an exit zone on either side of the former, for the guiding in and out of parts provided with a coating to be cured. The entry zone and/or the exit zone are in the form of inert gas locks, with an outer jacket tube and an inner jacket tube at a distance from the outer jacket tube so as to form an annular gap. On that side of it facing away from the irradiation zone, the inner jacket tube is connected to the outer jacket tube so as to be substantially flow-tight, while the annular gap is connected to one or more gas input lines for inert gas. A radiation chamber according to this prior art has a device for feeding the inert gas into the radiation chamber, while the base area of the radiation chamber has a gas outlet line to take away gas which has become impure or mixed with incoming oxygen. To further reduce the oxygen concentration in the radiation chamber, an inert gas lock is provided in both the entry zone and the exit zone.

DE 34 27 315 A1 discloses in order to improve a continuous system for treating coated mouldings with high-energy radiation under an inert gas atmosphere, having a conveying zone, an irradiation device arranged in the course of the conveying zone and having a channel system which encloses the conveying zone in the region of the irradiation device and has an inlet channel extending from an inlet opening to the irradiation device and an outlet channel extending from the irradiation device to an outlet opening and into which channel system inert gas can be introduced in the vicinity of the irradiation device, in such a manner that a higher throughput of mouldings per unit time can be achieved. It is proposed to provide the inlet channel and the outlet channel with, in each case, an injection opening for inert gas and to provide, in each case, an extraction device in the vicinity of the inlet opening and of the outlet opening so that the inert gas introduced into the inlet channel and the outlet channel flows substantially towards the corresponding inlet opening and outlet opening respectively.

The disadvantage with the methods according to the prior art is that the locks provided, also the inflow and outflow systems, are unable to prevent the entry and subsequent inflow of atmospheric oxygen and a creeping contamination of the atmosphere. In addition, a large volume of inert gas must be supplied on a continuing basis, but is then able to escape for example at the gas locks. The methods are therefore relatively inefficient.

BRIEF SUMMARY OF THE INVENTION

The object of the invention is to create a method of radiation curing in which the inert gas requirement is reduced, and the inflow of atmospheric oxygen can be minimised.

The problem is solved by a method with the features of claim 1, which recites a method for radiation curing of surfaces of workpieces, wherein the workpieces are held in a multiplicity of hermetically sealable and at least partly radiation-transparent holding fixtures and are fed consecutively in a cycle to an irradiation device wherein the holding fixtures with the workpieces contained therein are purged with inert gas, and before irradiation and/or during irradiation inert gas is fed into a holding fixture and the holding fixture is purged with inert gas and the gas displaced by purging is fed to one or more holding fixtures at a previous stage of the operating cycle, for purging of the same.

Advantageous developments are set out in the relevant dependent claims. For example, in a preferred embodiment of the invention, the steps of loading of a holding fixture with a workpiece, closing of the holding fixture, purging of the holding fixture with the purge gas of at least one holding fixture in a previous stage of the operating cycle, purging of the holding fixture with inert gas from an inert gas reservoir, irradiation of the workpiece and removal of the workpiece are carried out as consecutive steps. In a further embodiment, before purging of the holding fixture, the holding fixture is closed and evacuated. In a further preferred embodiment, before purging of the holding fixture, the holding fixture is closed and evacuated. In yet another embodiment, in the case of inert gases which are heavier than the air to be displaced, the inlet and the feed line to the holding fixture are provided in a bottom section and the corresponding vent opening in an upper section, and in the case of an inert gas which is lighter than the air to be displaced, the oxygen is provided in an upper section and the outlet line in a lower section.

A further problem is to create an apparatus for implementation of the method, which allows irradiation under a steady inert gas atmosphere, is economical, and gives better workpiece surface results.

The problem is solved by an apparatus with the features of claim 7, which is a preferred embodiment in which the holding fixtures are moved in a cycle from work station to work station wherein, in an irradiation station or an irradiation station upstream in the operating cycle the holding fixture at that station is supplied with inert gas and in a work area in which the holding fixture, after insertion of the workpiece, is closed, the inert gas is exhausted, wherein the inert gas is fed in a cycle through all intermediate holding fixtures.

Advantageous developments are indicated in the relevant dependent claims. For example, a preferred embodiment of the invention is wherein the holding fixtures are moved in a cycle from work station to work station wherein, in an irradiation station or an irradiation station upstream in the operating cycle the holding fixture at that station is supplied with inert gas and in a work area in which the holding fixture, after insertion of the workpiece, is closed, the inert gas is exhausted, wherein the inert gas is fed in a cycle through all intermediate holding fixtures. In yet another embodiment, the holding fixtures are static and the consecutive working steps are performed in a cycle at the static holding fixtures.

DETAILED DESCRIPTION OF THE INVENTION

The method according to the invention provides for components which are to be subjected to radiation treatment to be placed in separate encapsulated housings which are transparent to radiation, and for the relevant housings to be guided to an irradiation station.

According to the invention, the housings have inert gas feed lines and inert gas outlet lines, wherein the outlet line of a first housing is or may be connected to the feed line of a second housing. In the area of an irradiation station or a work station ahead of an irradiation station, pure inert gas is fed to a first housing, which is purged by the inert gas. This inert gas atmosphere is withdrawn and simultaneously fed to the next housing, which is the next in line for irradiation. From this housing in turn, a line leads to the next housing in the process sequence, which it purges with the inert gas atmosphere of the preceding two housings.

This process may be continued in any way desired so that, after opening of the housing and the insertion of one or more components (depending on size), the housing is closed, after which the inert gas atmosphere of the preceding chambers flow through it.

The inert gas requirement in this connection is low since the housing matched to the size of the component, or the number of components matched to the size of the housing, ensure that only the slight difference in volume between the housing and the component must be purged. In addition, the apparatus according to the invention and the method according to the invention are economical due to the fact that the purge gas atmosphere becomes increasingly purer from the start to the finish of the process. Consequently, an inert gas with a relatively high level of impurities may be used to start with, since this is not important at the beginning of the process. Therefore for example ten chambers or housings connected in series may be purged simultaneously, with however only a tenth of the gas volume emerging at the end. Due to the movement of the components in the opposite direction to the inert gas flow, the atmospheric oxygen concentration at the irradiation station is at its lowest.

The method is implemented preferably as a circulation process in which the housings or chambers are first of all loaded, then closed, then for example moved on, with purging taking place at various work stations until a last purging with inert gas takes place at an irradiation station. After the irradiation station, the chamber is disconnected from the inert gas supply. It may then be opened and guided to the loading stage. The circulation process is in the form of an indexed circular movement.

In this connection the chambers or housings may for example be connected to an inlet and an outlet valve to which are connected lines which respectively feed in the gas from the preceding chamber or withdraw it for irradiation of the chamber.

In the invention it is of particular advantage that the purging process is carried out especially efficiently and, according to the invention, a pure inert gas atmosphere may be obtained with relatively little expense, so that components with better surface quality may be produced.

Figure 1:
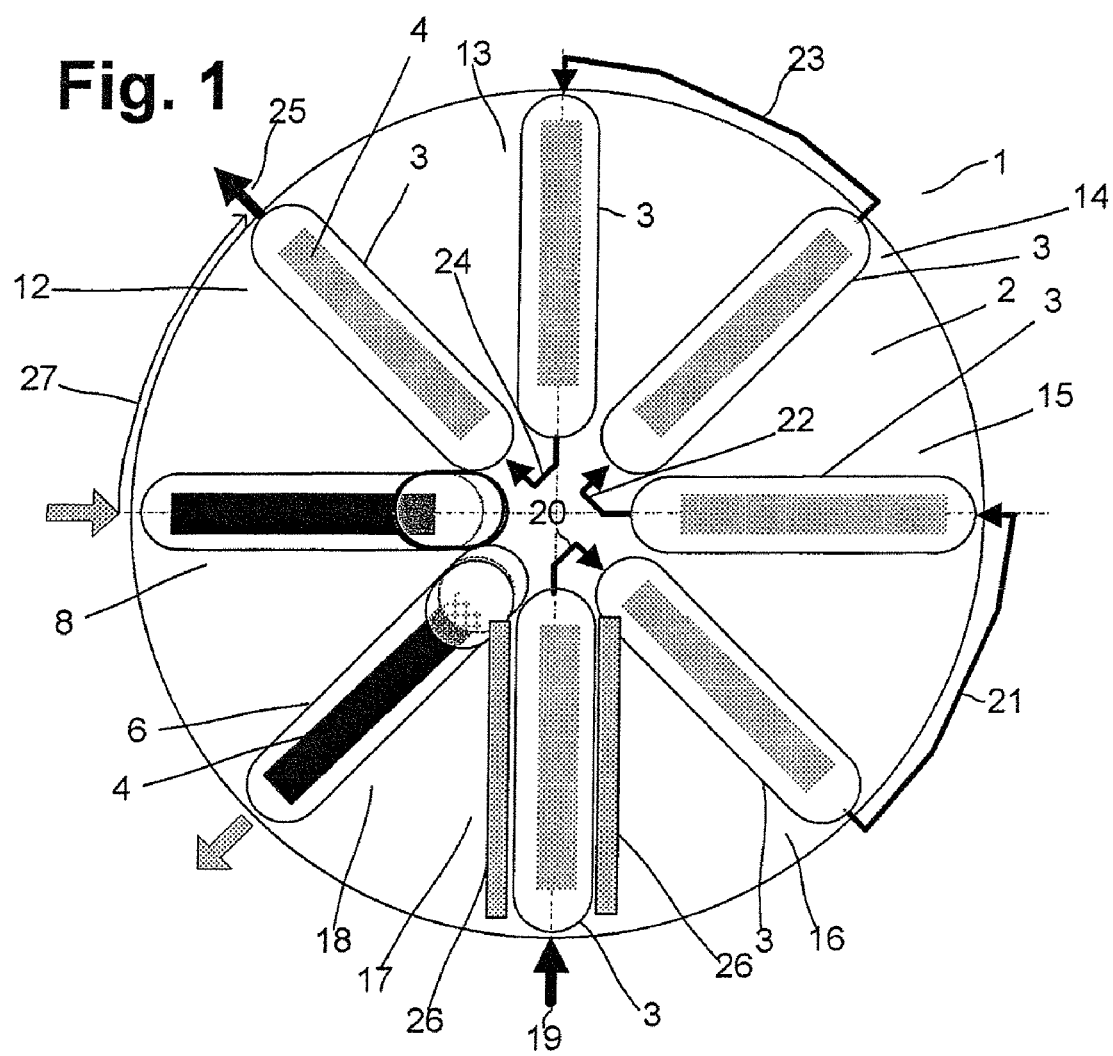
Figure 3:
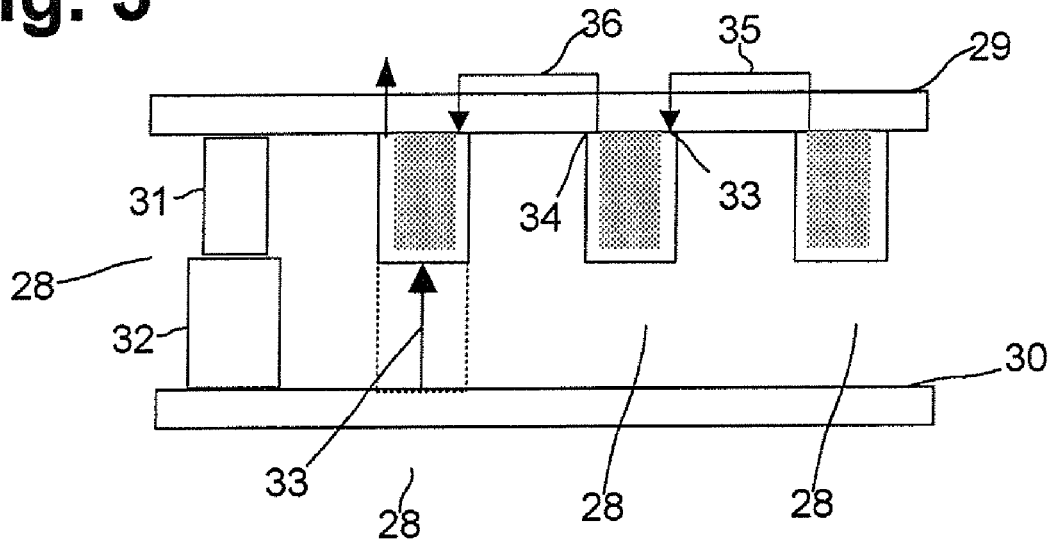
Figure 4:
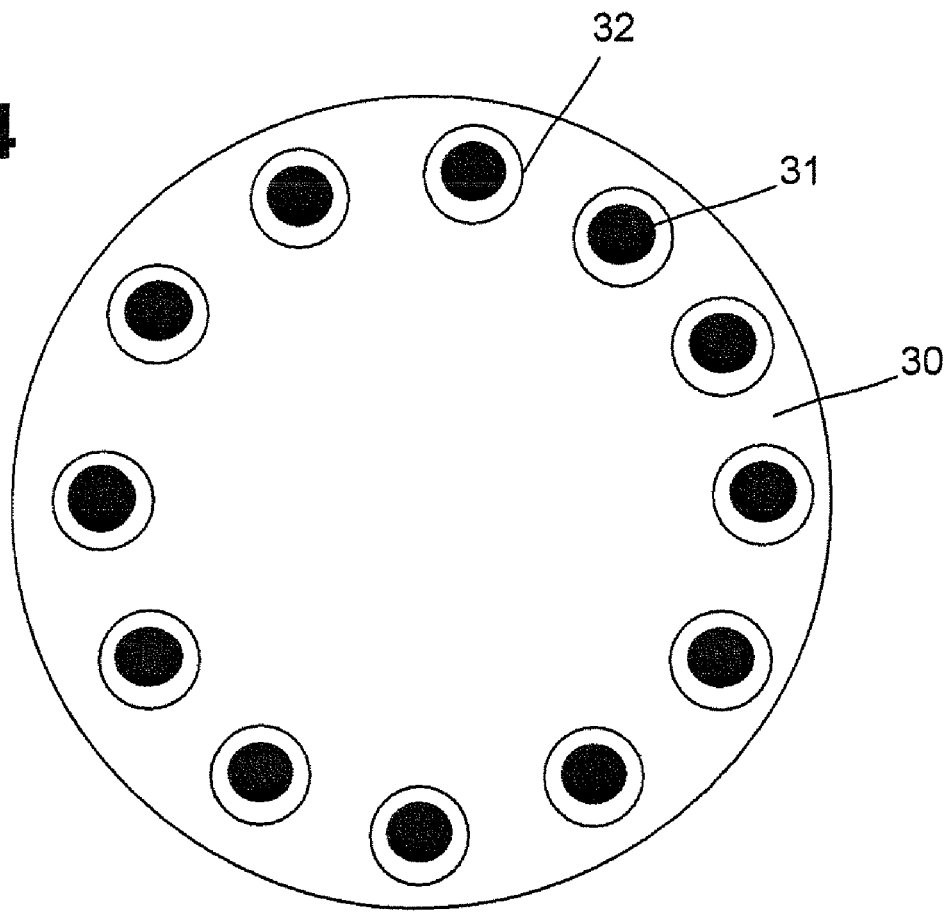
Figure 6:
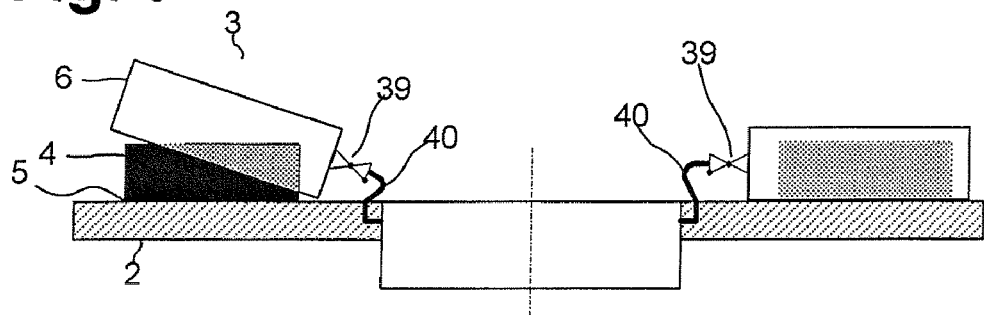
Figure 5:
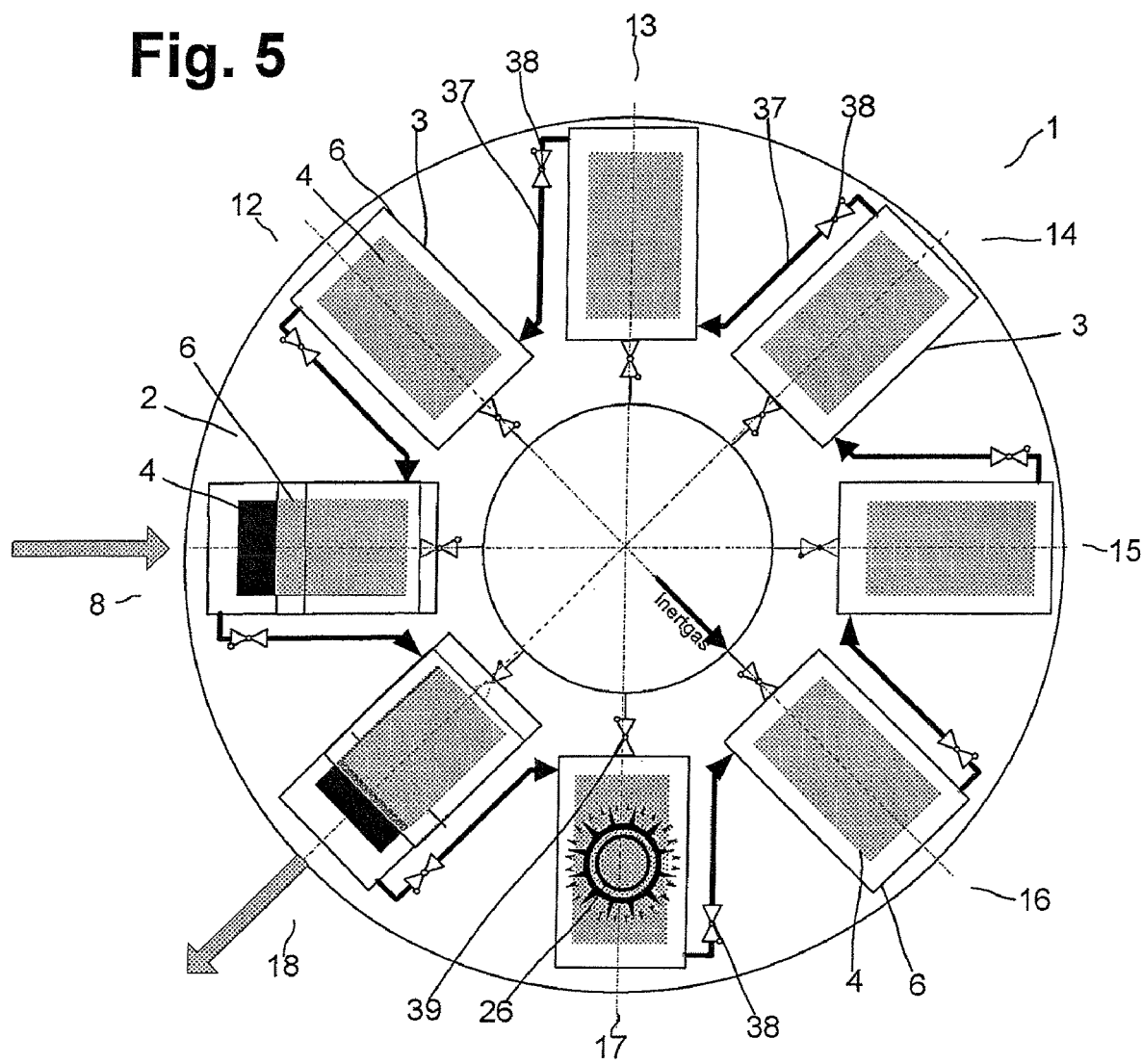

The invention is explained by way of example with the aid of a drawing which shows schematically in:

FIG. 1 a first embodiment of an apparatus according to the invention in a plan view;

FIG. 2 the apparatus according to FIG. 1 in a cross-sectional view;

FIG. 3 a further embodiment of the apparatus according to the invention in plan view;

FIG. 4 the apparatus of FIG. 3 in a side view;

FIG. 5 a third embodiment of an apparatus according to the invention in plan view;

FIG. 6 the apparatus of FIG. 5 in a cross-sectional view.

An apparatus 1 according to the invention has for example an indexing rotary table 2. The indexing rotary table 2 has a circular plate shape, with a drive allowing it to rotate continuously or in cycles by preset angular dimensions.

Provided on the indexing rotary table 2 are several holding fixtures 3 for workpieces 4 to be processed.

In FIGS. 1 and 2, the holding fixtures 3 are designed for elongated workpieces, for example automobile or truck axles. The holding fixtures 3 here are star-shaped with their longitudinal extent facing outwards around the periphery of the indexing rotary table 2.

Each of the holding fixtures 3 has a tray area 5 on which a workpiece 4 is placed, and a hood 6 to cover the workpiece 4 from above.

The tray area 5 may have a contoured section, applied to or integrated in the indexing rotary table 2, comprising for example bases or mounts (not shown) for the placing of the workpieces 4, or comprising a shaped recess into which the workpiece 4 is placed.

The tray area 5 may also be shell- or trough-like, with high side wall sections inside which the workpieces 4 may be placed. In the case of such an embodiment, the area 5 is preferably made transparent or transmissive to radiation.

The hood 6 is so designed in respect of its height, width and length that it completely covers from above a workpiece 4 placed on the tray area 5.

The hood 6 is transparent, or at least transmissive to radiation to be used in the irradiation process. Preferably the hood 6 has a continuous seal (not shown) on its bottom edge areas 7, by which the hood lies on the tray area 5 and the indexing rotary table 2 respectively.

The indexing rotary table 2 has several work stations, fixed immovably to the indexing rotary table 2 and the apparatus 1 respectively.

A first work station 8 is the loading station 8. In the loading station 8, the hood 6 is raised or folded back from the tray area 5 (FIG. 1), and a workpiece 4 is placed on the tray area 5 or pushed in so that the hood 6 may then be placed over the tray area 5 and closed. In this way the workpiece 4 is fitted into a quasi-sealed container.

When the hood 6 has been closed, the holding fixture 3 is hermetically sealed, and the indexing rotary table 2 cycles on to the next position, so that the workpieces 4 resting under the hood arrive at the next work station.

The containers for the workpieces 4 formed by the tray area 5 and the hood 6 each have a feed line and an outlet line for inert gas.

In principle, the term "inert gas" should be understood to mean pure inert gas, such as e.g. pure nitrogen or pure $CO_2$. In certain circumstances, though, it may also be expedient to supply as inert gas a gas mixture containing an inert gas as a main constituent.

The feed lines and outlet lines may be arranged differently, depending on the inert gas and the remaining gas volume in the working space formed by the tray area 5 and the hood 6.

In the case of inert gases which are heavier than the air (for example $CO_2$) to be displaced, the inflow and the feed line are provided at the bottom of the tray area 5, or below the tray area 5 through the indexing rotary table 2, at positions 9a or 11b. The corresponding vent opening is provided preferably diagonally opposite at positions 9b or 11a at the top of the hood.

In the case of an inert gas which is lighter than the air (for example pure nitrogen) to be displaced, the feed line is provided in an upper area of the hood 6, for example in positions 11a or 9b, while the outlet line is located in a lower area in positions 9a or 11b.

If volumes are small, the arrangement of these feed and outlet lines is not so important, so that the feed lines may also be provided on the opposite end face area of the hood 6 in positions 10a and 10b (FIG. 2).

Through the cycling movement of the indexing rotary table 2, the workpieces and the containers comprised of the tray area 5 and hood 6 which enclose them are moved from one work station to the next work station.

For example eight containers are provided at eight work stations 8, 12, 13, 14, 15, 16, 17 and 18, the containers each comprising a tray area 5 and a hood 6.

The work stations 8, 12, 13, 14, 15, 16, 17 and 18 are so connected to one another by lines provided in or on the indexing rotary table 2 or on the hoods 6, that inert gas is fed from one container which has already advanced in the process, to the next container which follows.

This means that when the indexing rotary table 2 is rotated in the clockwise direction, the inert gas is locked through anti-clockwise, via all work stations, up to the outlet.

From a gas supply unit, not shown, such as e.g. a bottle, tank or air decomposition unit, gas is fed through a feed line 19 into a first holding fixture 3 at an irradiation station 17. At an opposite end of the holding fixture 3 is an outlet line 20 which feeds the gas from the holding fixture 3 in work station 17 into the next holding fixture 3 in the clockwise direction. At the opposite end of this holding fixture 3 is an outlet line 21 which in turn feeds the gas into the next holding fixture in the clockwise direction. At the opposite end of the latter is another line 22 through which the gas is taken from this holding fixture 3 into that which follows, from which the gas is again fed via a further line 23 into the next holding fixture 3. From there, a line 24 carries the gas to the last holding fixture 3 as far as the inert gas supply is concerned, from which either an exhaust line 25 locks the gas out of the system, or else the gas is able to escape the system via the opened hoods of the loading station and the removal station 18.

The line system comprising the lines 19, 20, 21, 22, 23, 24 and 25 is fitted immovably to the indexing rotary table 2, and therefore preferably does not rotate with it. Lines 19 to 25 have coupling elements by which they may be coupled to the relevant lines 19 to 25 on or in the indexing rotary table 2 and to the holding fixtures 3 respectively. This means that, before onwards rotation of the indexing rotary table 2, decoupling takes place, followed by recoupling after the further rotation, and then the relevant purging. During the periods of rotation, when no gas is supplied, the feed lines of the holding fixture 3 concerned are closed with a gas-tight seal. For purging, inert gas is supplied only through feed line 19 and not only undertakes purging at work station 17 but also, due to the displacement of the gas already present in the holding fixture 3 at work station 17, displaces the next following holding fixture 3 or container 3. This process continues in the same manner until the first container or holding fixture 3 to be purged, from which the atmosphere it contains, which at this point in time does not yet contain any inert gas, is expelled to line 25.

The work stations 12, 13, 14, 15 and 16 are used here for example solely for purging. In work station 17, the workpieces 4 are irradiated through the hood 6 by an irradiation device 26.

The irradiation device 26 may extend in the manner of a hood around the hood 6. If the workpieces 4 are elevated, then the irradiation device 26 may be so designed as to irradiate the workpiece 4 from all sides.

After irradiation in the work area 17, the holding fixture 3 with the suitably irradiated workpiece 4 moves on to a removal station 18 in which the hood 6 is opened by folding back, lifting up or removing, and the finished irradiated workpiece 4 may be removed.

With a further rotation, the empty tray area 5 moves into the loading station 8 described earlier, at which the cycle begins again.

The number of rotations and the angle of rotation 27 naturally depend on the number of holding fixtures 3 on the indexing rotary table 2.

The holding fixtures 3 may have any shape desired, depending on the workpiece 4 to be irradiated.

In a further embodiment of the invention (FIGS. 3, 4), once again several work stations 28 are provided on a first indexing rotary table 29.

Parallel to the first indexing rotary table 29 is a second indexing rotary table 30.

In this embodiment, the components 31 are suspended from the upper indexing rotary table 29 or set up on the lower indexing rotary table 30. Arranged on the respectively opposite indexing rotary table 29, 30 are cup-like hoods 32, which may be put over the workpieces or components 31 from above or below. Within the area of the hood 32, each work station has a feed port 33 for inert gas and an outlet port 34 for inert gas.

The respective ports 33, 34 may be similarly coupled for fluid flow by feed lines 35 and outlet lines 36 to the respectively preceding or following hood or the preceding or following work station, so that through-flow and purging similarly take place against the direction of rotation.

In the case of this apparatus according to the invention too, the workpieces 31 may be handed over at a special station and removed at another station, while irradiation may also take place at a third station. The general arrangement then corresponds to that of the first embodiment.

With small workpieces 31 and small hoods 32, irradiation devices (not shown) may be provided at each work station, so that only suitable removal and insertion devices must be provided on the apparatus 1. Here it is not necessary to make a full rotation for insertion and removal of the workpieces 31, but instead removal may be effected when on the one hand adequate purging and subsequently adequate irradiation have taken place. With a large indexing rotary table 29, this may already be the case for example after a quarter of the full rotation.

When the components 31 are suspended, the hoods 32 are moved upwards against the upper indexing rotary table 29 for example by a pneumatic or hydraulic punch 33. In the case of a static arrangement of the components 31, the hoods 32 may be lowered from above by a pneumatic or hydraulic punch, a servo or linear motor or similar drives.

Common to all the embodiments described above is that the direction of flow of the inert gas is opposite to the direction of movement of the components 31, so that the residual oxygen concentration steadily declines in the direction of an exposure position.

FIGS. 5 and 6 show a third embodiment of an apparatus according to the invention for the radiation curing of surfaces of workpieces 4. The basic design of this embodiment corresponds in principle to that of the apparatus of FIGS. 1 and 2, for which reason identical parts have the same reference numbers.

This third embodiment also has an indexing rotary table 2 with several holding fixtures 3 for workpieces to be processed. Each holding fixture 3 has a tray area 5 on which the workpieces are placed, and a hood 6 for covering the respective workpiece 4 from above. The adjacent holding fixtures or work stations 3 are again connected to one another by communicating lines. In the present embodiment, these connecting lines 37 are each connected by their ends to the hoods 6. In each of the connecting lines 37 a non-return valve 38 is provided in such a way that a flow between two adjacent holding fixtures 3 is possible only against the rotary movement of the indexing rotary table 2, i.e. against the direction of movement of the holding areas 3. In addition, each hood 6 is provided with a line coupling 39 to which is coupled in each case a feed line 40 for inert gas. The feed lines 40 terminate with their ends which face away from the holding fixtures 3 at a carousel (not illustrated) which has a passage to a gas supply unit in the position of work station 16, and which isolates the ends of the feed lines at the other positions.

The supply of inert gas may also as an alternative be controlled by automatically switching valves. These valves are then located in the feed lines 40.

The line couplings 39 are each provided with a non-return valve in such a way that inert gas may be fed into the holding fixtures 3 through these line couplings 39, but is then unable to escape from the holding fixtures 3.

This apparatus is operated in the same way as the first embodiment but, as already explained above, the irradiation station 17 is separated from the work station 16 into which the inert gas is fed, and here in principle during the feeding-in of inert gas at least one of the hoods 6 of the loading station 8 or the removal station 18 is opened, so that inert gas present in work station 12 may be discharged into the surrounding environment, and no air/inert gas mixture is fed to the irradiation station 17.

In this embodiment, there is no gas flow at the irradiation station 17. It has been shown that a settled atmosphere is of benefit to the curing process.

For all the embodiments described above, control of the inert gas may be effected via the residual oxygen content in the holding fixtures 3, i.e. through a suitable sensor in the outlet line 25 or beneath each hood 6.

Due to the inert gas routing according to the invention via the individual holding fixtures 3 and containers or housings respectively, the displacement of the original atmosphere and of the oxygen is effected substantially in the form of displacement purging and not as dilution purging. This also leads to a reduction in the inert gas requirement.

In particular in the embodiments according to FIGS. 1, 2 and 3, the components 4 may be mounted rotatably or pivotably within the transparent hood 6 and holding fixture 3 or container, so that an even dose of radiation is given to the component surface during the UV irradiation.

It is also possible to move the UV radiation devices 26 during the drying process. Any desired shadows within the holding fixture 3 may be obtained by inbuilt reflector panels, as also improved illumination. In this connection the hoods 6 may be completely transparent or provided with windows.

For further improvement of efficiency, the closed holding fixtures 3 may be subject to evacuation before purging with inert gas.

REFERENCE NUMBERS

1 apparatus according to the invention
2 indexing rotary table
3 holding fixtures
4 workpieces
5 tray area
6 hood
7 bottom edge areas of 6
8 first work station/loading station
9*a* position of the feed line
9*b* position of the vent opening
10*a,b* position of the feed line
11*a* a position of the vent opening
11*b* position of the feed line
12-18 work station
19 feed line
20 outlet line
21 outlet line
22 line
23 line
24 line
25 outlet line
26 irradiation device
27 angle of rotation
28 work stations
29 indexing rotary table
30 indexing rotary table
31 components
32 hoods
33 feed port
34 outlet port
35 feed lines
36 outlet lines
37 connecting line
38 non-return valve
39 line coupling
40 feed line

The invention claimed is:

1. Method for radiation curing of surfaces of workpieces, wherein the workpieces are held in a multiplicity of hermetically sealable and at least partly radiation-transparent holding fixtures and are fed consecutively in a cycle to an irradiation device wherein the holding fixtures with the workpieces contained therein are purged with inert gas, and before irradiation and/or during irradiation inert gas is fed into a holding fixture and the holding fixture is purged with inert gas and the gas displaced by purging is fed to one or more holding fixtures at a previous stage of the operating cycle, for purging of the same.

2. Method according to claim 1, wherein loading of a holding fixture with a workpiece, closing of the holding fixture, purging of the holding fixture with the purge gas of at least one holding fixture in a previous stage of the operating cycle, purging of the holding fixture with inert gas from an inert gas reservoir, irradiation of the workpiece and removal of the workpiece are carried out as consecutive steps.

3. Method according to claim 1, wherein before purging of the holding fixture, the holding fixture is closed and evacuated.

4. Method according to claim 2, wherein before purging of the holding fixture, the holding fixture is closed and evacuated.

5. Method according to claim 1, wherein in the case of inert gases which are heavier than the air to be displaced, the inlet and the feed line to the holding fixture are provided in a bottom section and the corresponding vent opening in an upper section, and in the case of an inert gas which is lighter than the air to be displaced, the oxygen is provided in an upper section and the outlet line in a lower section.

6. Method according to claim 4,
wherein in the case of inert gases which are heavier than the air to be displaced, the inlet and the feed line to the holding fixture are provided in a bottom section and the corresponding vent opening in an upper section, and in the case of an inert gas which is lighter than the air to be displaced, the oxygen is provided in an upper section and the outlet line in a lower section.

7. Method according to claim 1,
wherein the holding fixtures are moved in a cycle from work station to work station wherein, in an irradiation station or an irradiation station upstream in the operating cycle the holding fixture at that station is supplied with inert gas and in a work area in which the holding fixture, after insertion of the workpiece, is closed, the inert gas is exhausted, wherein the inert gas is fed in a cycle through all intermediate holding fixtures.

8. Method according to claim 6,
wherein the holding fixtures are moved in a cycle from work station to work station wherein, in an irradiation station or an irradiation station upstream in the operating cycle the holding fixture at that station is supplied with inert gas and in a work area in which the holding fixture, after insertion of the workpiece, is closed, the inert gas is exhausted, wherein the inert gas is fed in a cycle through all intermediate holding fixtures.

9. Method according to claim 1,
wherein the holding fixtures are static and the consecutive working steps are performed in a cycle at the static holding fixtures.

10. Method according to claim 6,
wherein the holding fixtures are static and the consecutive working steps are performed in a cycle at the static holding fixtures.

* * * * *